United States Patent
Seino

(10) Patent No.: US 9,544,717 B2
(45) Date of Patent: Jan. 10, 2017

(54) IN-VEHICLE COMMUNICATION DEVICE

(71) Applicant: HONDA MOTOR CO., LTD., Tokyo (JP)

(72) Inventor: Kohei Seino, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/803,472

(22) Filed: Jul. 20, 2015

(65) Prior Publication Data
US 2016/0029243 A1 Jan. 28, 2016

(30) Foreign Application Priority Data

Jul. 22, 2014 (JP) .................................. 2014-148738

(51) Int. Cl.
*H04W 4/00* (2009.01)
*H04W 40/02* (2009.01)
*H04L 12/803* (2013.01)
*H04L 12/851* (2013.01)
*H04W 28/08* (2009.01)
*H04W 88/06* (2009.01)

(52) U.S. Cl.
CPC ............ *H04W 4/008* (2013.01); *H04L 47/125* (2013.01); *H04L 47/24* (2013.01); *H04W 40/02* (2013.01); *H04W 28/08* (2013.01); *H04W 88/06* (2013.01)

(58) Field of Classification Search
CPC .. H04W 28/0215; H04W 4/008; H04W 88/06; H04W 28/08; H04B 1/70758; H04B 10/2581
See application file for complete search history.

(56) References Cited

U.S. PATENT DOCUMENTS

| 6,542,816 B1* | 4/2003 | Ito .......................... G01C 21/32 |
| | | 340/905 |
| 2007/0027610 A1* | 2/2007 | Parikh ...................... G08G 1/20 |
| | | 701/117 |
| 2010/0234071 A1* | 9/2010 | Shabtay ............... H04B 7/0408 |
| | | 455/562.1 |
| 2011/0143667 A1* | 6/2011 | Cugnini ............. H04N 21/6131 |
| | | 455/41.2 |
| 2014/0177495 A1* | 6/2014 | Mallikarjunan .. H04W 52/0245 |
| | | 370/311 |
| 2014/0213256 A1* | 7/2014 | Meylan ................. H04W 36/22 |
| | | 455/436 |
| 2014/0244805 A1* | 8/2014 | Lee ....................... H04W 8/245 |
| | | 709/219 |

(Continued)

FOREIGN PATENT DOCUMENTS

| JP | 2003-309865 A | 10/2003 |
| JP | 2010-268334 A | 11/2010 |

*Primary Examiner* — Andrew Wendell
(74) *Attorney, Agent, or Firm* — Westerman, Hattori, Daniels & Adrian, LLP

(57) ABSTRACT

An in-vehicle terminal device includes: a wireless LAN communication section capable of performing wireless communication over a short range; a cellular communication section capable of performing wireless communication over a longer range than the wireless LAN communication section; and a communication method selection section which selects the wireless LAN communication section or the cellular communication section according to a real-time communication requirement for data to be transmitted to or received from outside of a vehicle.

9 Claims, 6 Drawing Sheets

(56) References Cited

U.S. PATENT DOCUMENTS

| | | | | |
|---|---|---|---|---|
| 2014/0293959 A1* | 10/2014 | Singh | ............... | H04W 36/0016 370/331 |
| 2014/0295843 A1* | 10/2014 | Van Der Velde | ..... | H04W 36/22 455/436 |
| 2015/0023341 A1* | 1/2015 | Zhao | .................... | H04W 48/18 370/338 |
| 2015/0230150 A1* | 8/2015 | Wang | ................ | H04B 7/18506 370/252 |

* cited by examiner

IN-VEHICLE COMMUNICATION DEVICE

CROSS REFERENCES TO RELATED APPLICATIONS

The present application claims priority under 35 U.S.C. §119 to Japanese Patent Application No. 2014-148738, filed Jul. 22, 2014, entitled "In-vehicle Communication Device." The contents of this application are incorporated herein by reference in their entirety.

BACKGROUND

1. Field

The present disclosure relates to an in-vehicle communication device installed in a vehicle.

2. Description of the Related Art

To date, various in-vehicle communication devices that are installed in vehicles, and that transmit and receive data to and from external devices have been developed. Recently, various technologies for complementarily performing wireless communication using short-range wireless communications including a dedicated short-range communication (DSRC) method, and long-range wireless communications including a cellular method have been proposed.

Japanese Unexamined Patent Application Publication No. 2003-309865 (paragraphs [0010] and [0011]) proposes an in-vehicle communication device that connects to an access point for long-range wireless communication if there is no available access point for short-range wireless communication.

Japanese Unexamined Patent Application Publication No. 2010-268334 (paragraph [0010]) proposes an in-vehicle communication device that switches to long-range wireless communication if it is detected that the vehicle has started to move while data communication is being performed using short-range wireless communication.

In general, such in-vehicle communication devices handle various types of data. Examples of the data include probe information for which a high degree of freshness is required, and map information for which a not-so-high degree of freshness is required.

However, the types of data are not considered at all in the devices proposed in Japanese Unexamined Patent Application Publication No. 2003-309865 and Japanese Unexamined Patent Application Publication No. 2010-268334, and an appropriate communication method cannot be selected in some cases.

SUMMARY

The present application describes an in-vehicle communication device that can select an appropriate communication method for each of various data types in order to solve the abovementioned problem.

An in-vehicle communication device according to an aspect of the present disclosure is installed in a vehicle, and includes a short-range communication unit (a short-range communicator) capable of performing wireless communication over a short range, a long-range communication unit (a long-range communicator) capable of performing wireless communication over a longer range than the short-range communication unit, and a communication method selection unit (a communication selector) that selects the short-range communication unit or the long-range communication unit according to a real-time communication requirement for data to be transmitted to or received from outside of the vehicle.

As described above, the communication method selection unit, which selects the short-range communication unit or the long-range communication unit according to the real-time communication requirement for data to be transmitted to or received from outside of the vehicle, is provided, and thus, an appropriate communication method that is suitable for the freshness of data can be selected for each of various data types.

It is preferable that the communication method selection unit selects the long-range communication unit when the real-time communication requirement is high, and select the short-range communication unit when the real-time communication requirement is low. By selecting the long-range communication unit for data for which a high degree of freshness is required, and selecting the short-range communication unit for data for which a not-so-high degree of freshness is required, the balance of processing loads between both communication methods can be adjusted.

It is also preferable that the communication method selection unit select the short-range communication unit or the long-range communication unit according to a limit of a data communication capacity of the long-range communication unit. By taking into consideration a case where a limit of a communication capacity is imposed when using long-range wireless communication, a more appropriate communication method can be selected.

In this case, the communication method selection unit may select the short-range communication unit if an accumulated value of the communication capacity in a predetermined time range is equal to or larger than a first threshold, and select the long-range communication unit if the accumulated value of the communication capacity is smaller than the first threshold. By taking into consideration a case where a limit of an accumulated value of the communication capacity in a predetermined time range is imposed when using long-range wireless communication, a more appropriate communication method can be selected.

It is also preferable that the communication method selection unit select the short-range communication unit or the long-range communication unit according to a communication amount of data to be transmitted to or received from outside of the vehicle. By taking into consideration the tendency for communication time to increase as a data communication amount increases, a more appropriate communication method can be selected.

In this case, the communication method selection unit may select the short-range communication unit if the communication amount of the data is equal to or larger than a second threshold, and select the long-range communication unit if the communication amount of the data is smaller than the second threshold. By selecting the short-range communication unit when the data communication amount is large, and by selecting the long-range communication unit when the data communication amount is small, the balance of processing loads between both communication methods can be adjusted. In one embodiment, the in-vehicle communication device further comprises an in-vehicle terminal device configured to obtain the data relating to vehicle conditions or environments (such as vehicle's operation or accident-related information, and traffic or weather information at a vehicle's location) and to store the data in a manner that associates the data with the real-time communication requirement thereof which is determined depending on an acceptable time of period required to complete transmission/ reception processing of the data after the in-vehicle terminal device obtains the data for the wireless communication.

DESCRIPTION OF THE PREFERRED EMBODIMENTS

Preferred embodiments of the in-vehicle communication device of the present application will be explained in detail with reference to accompanying drawings.

Whole Configuration of Vehicle Information Communication System 10

Figure 1:
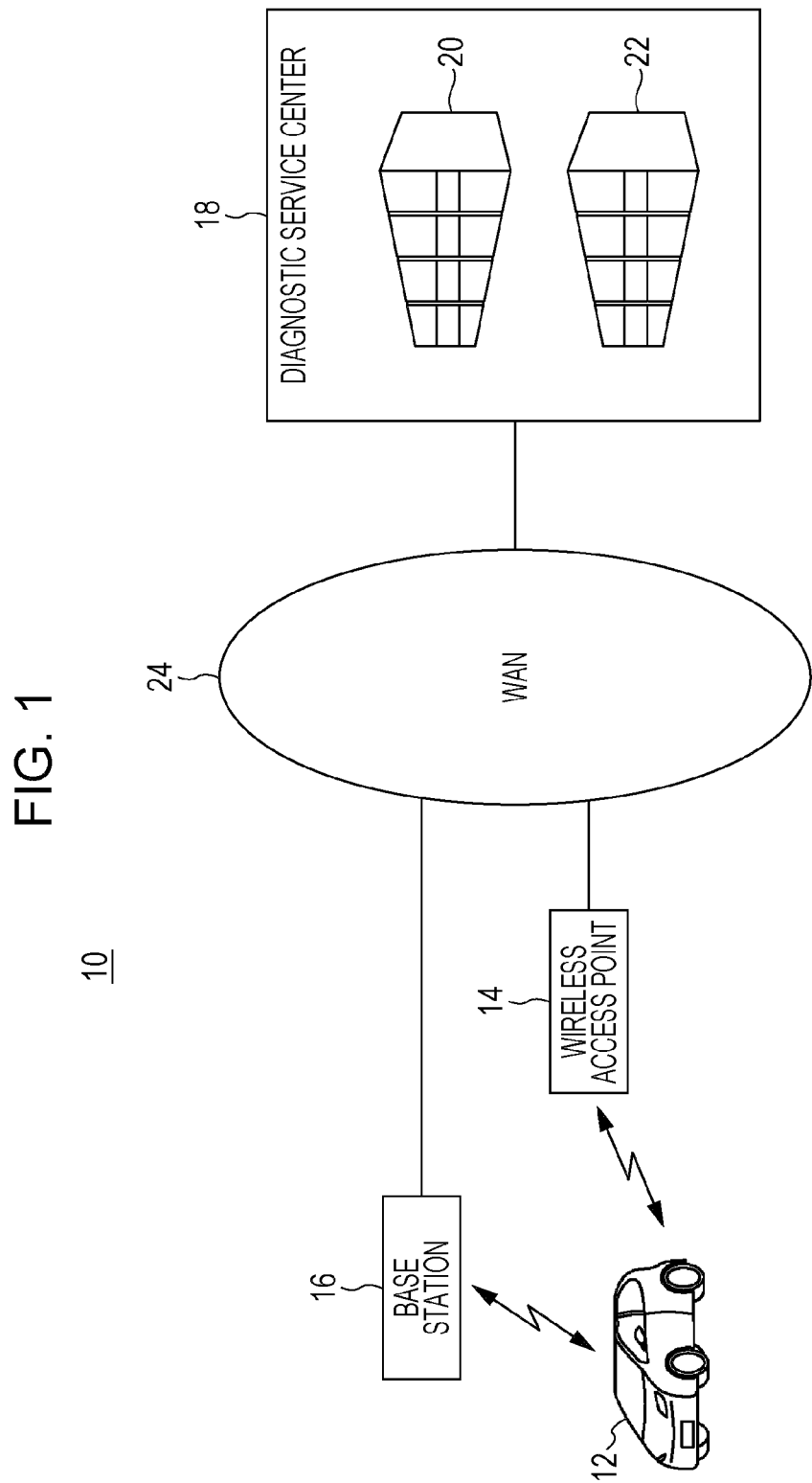
FIG. 1 is a diagram of the whole configuration of a vehicle information communication system according to a preferred embodiment.

FIG. 1 is a diagram of the whole configuration of a vehicle information communication system 10 according to a preferred embodiment. The vehicle information communication system 10 is basically made up of a vehicle 12, a wireless access point 14, a base station 16, and servers 20 and 22 installed in a diagnostic service center 18. The wireless access point 14, the base station 16, and the servers 20 and 22 are connected to each other via a network 24 (a wide area network (WAN) in the drawing).

The wireless access point 14 is a device that relays wireless communications between the vehicle 12 and the servers 20 and 22. The base station 16 is a device that relays wireless communications between the vehicle 12 and the servers 20 and 22. The servers 20 and 22 are devices that manage various kinds of information indicating the conditions of the vehicle 12.

Electrical Block Diagram of Vehicle Information Communication Device 30

Figure 2:
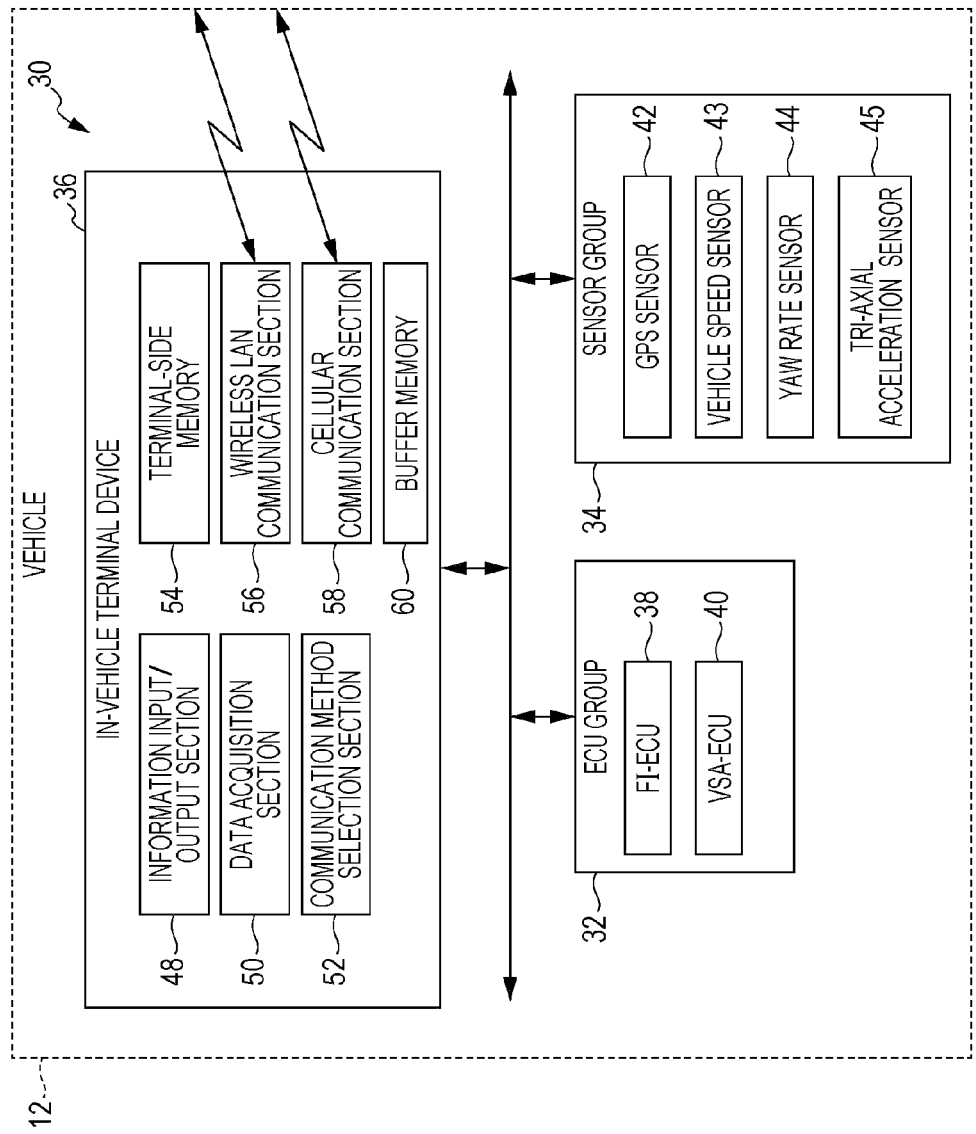
FIG. 2 is an electrical block diagram of a vehicle information communication device installed in a vehicle of FIG. 1.

FIG. 2 is an electrical block diagram of a vehicle information communication device 30 installed in the vehicle 12 of FIG. 1. The vehicle information communication device 30 is basically made up of an electronic control unit (ECU) group 32 including at least one ECU, a sensor group 34 including at least one sensor, and an in-vehicle terminal device 36 as an in-vehicle communication device.

The ECU group 32 includes an ECU that controls a fuel injection device (not shown) (hereinafter referred to as the FI-ECU 38; fuel injection ECU), and an ECU that controls behavior stabilization of the vehicle 12 (hereinafter referred to as the VSA-ECU 40; vehicle stability assist ECU). The FI-ECU 38 and the VSA-ECU 40 output anomaly codes, etc. corresponding to the types of anomaly being detected.

The sensor group 34 includes a global positioning system (GPS) sensor 42 that detects signals from GPS satellites, a vehicle speed sensor 43 that detects a speed of the vehicle 12, a yaw rate sensor 44 that detects a yaw rate of the vehicle 12, the yaw rate being an angular velocity around a vertical axis, and a tri-axial acceleration sensor 45 that detects a tri-axial acceleration of the vehicle 12.

The in-vehicle terminal device 36 is formed of, for example, a display audio device, or a car navigation device. The in-vehicle terminal device 36 is provided with an information input/output section 48, a data acquisition section 50, a communication method selection section 52 (a communication method selector), a terminal-side memory 54, a wireless LAN communication section 56 (a short-range communicator), and a cellular communication section 58 (a long-range communicator).

The information input/output section 48 inputs and outputs various kinds of information via a human-machine interface (HMI). The information input/output section 48 includes a display that outputs visual information, and a loudspeaker that outputs sound information, as output sections. The information input/output section 48 includes a touch sensor that is used to input a contact position on the display screen, and a microphone that is used to input sound information, as input sections.

A terminal-side control section (not shown) reads and executes programs stored in a terminal-side memory 54, and, as a result, functions including the data acquisition section 50 and the communication method selection section 52 can be realized. The terminal-side control section is formed of a processor, such as a micro-processing unit (MPU) or a central processing unit (CPU).

The terminal-side memory 54 stores programs and data required to control each component. The terminal-side memory 54 also stores table data (hereinafter referred to as the attribute table) in which an attribute of a real-time communication requirement in transmission/reception processing is stored for each type of data, whereby each data is stored in a manner that associates the data with the level of its real-time communication requirement for wireless communication (transmission and/or receipt).

The wireless LAN communication section 56 is formed of a wireless module capable of performing wireless communication over a relatively short range (hereinafter referred to also as "short-range wireless communication"). The short-range wireless communication includes wireless communication (including WiFi) that conforms to IEEE802.11x standards, DSRC, Bluetooth (registered trademark), and the like.

The cellular communication section 58 is formed of a wireless module capable of performing wireless communication over a relatively long range (hereinafter referred to also as "long-range wireless communication"). The long-range wireless communication includes so-called "3G" (third-generation mobile communication method), "4G" (fourth-generation mobile communication method), Long-Term Evolution (LTE), Worldwide Interoperability for Microwave Access (WiMAX), and the like.

A buffer memory 60 is formed of a volatile memory such as a random access memory (RAM). The buffer memory 60 temporarily stores data to be transmitted to and data received from the servers 20 and 22.

Electrical Block Diagram of Servers 20 and 22

Figure 3:
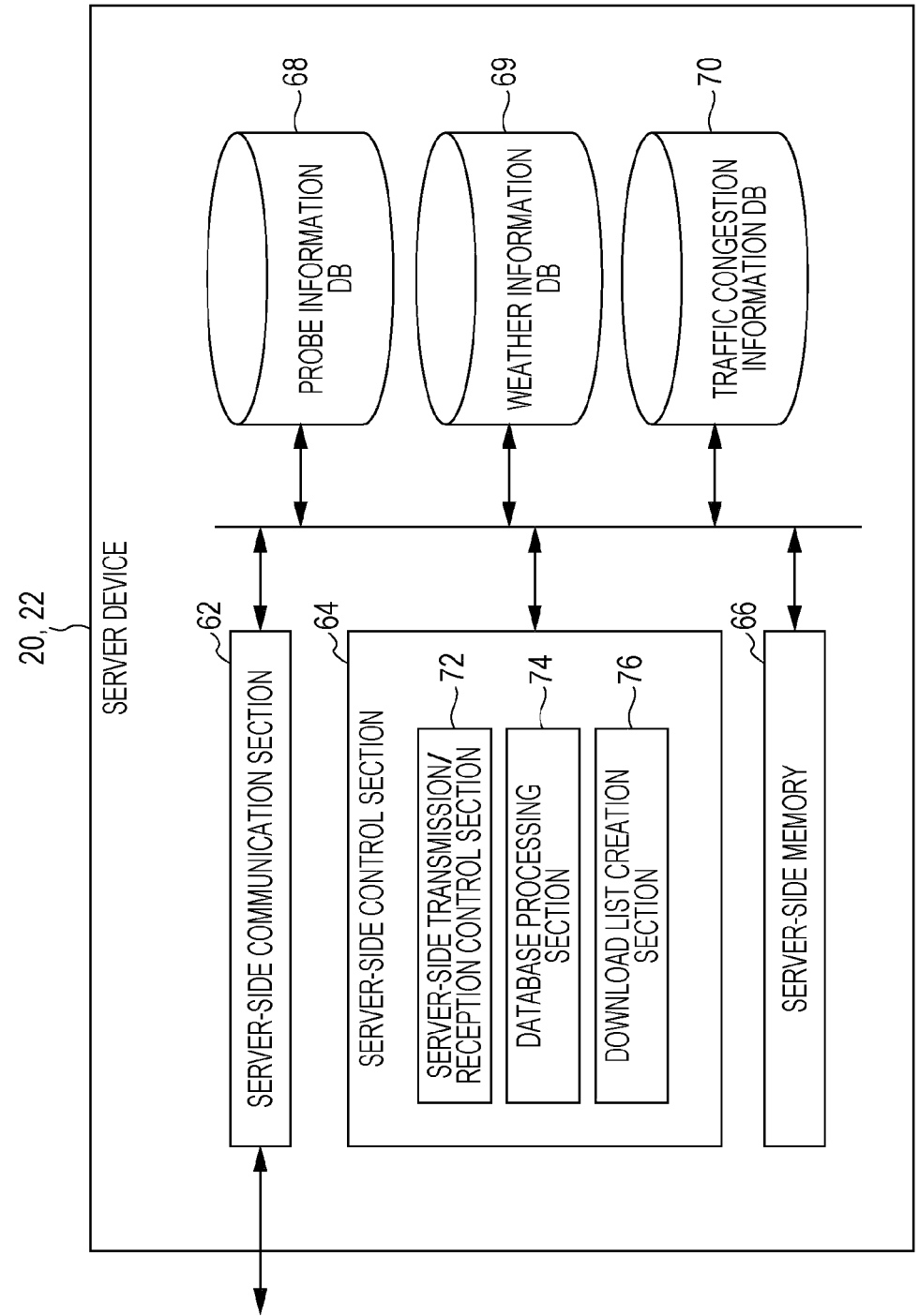
FIG. 3 is an electrical block diagram of a server illustrated in FIG. 1.

FIG. 3 is an electrical block diagram of the server 20 illustrated in FIG. 1. The server 20 is a computer provided with a server-side communication section 62, a server-side control section 64, a server-side memory 66, and various databases. Meanwhile, the server 22 may have the same configuration as the device configuration illustrated in the drawing, or a different configuration.

In the server 20, a database (hereinafter referred to as the probe information DB 68) that stores therein probe information on moving states of the vehicle 12, a database (hereinafter referred to as the weather information DB 69) that stores therein weather information on climate and weather for each area, and a database (hereinafter referred to as the traffic congestion information DB 70) that stores therein traffic congestion information on the traffic conditions of roads are constructed. Meanwhile, the architectures (for example, the structure and the type of data, and the number of devices used) of the databases are not limited to the example in the drawing, and various designs may be adopted.

The server-side communication section 62 is formed of a communication module that transmits and receives electrical signals to and from an external device through wired or wireless communication. The server 20 thereby can receive probe information from the vehicle 12 (FIG. 1) and can transmit weather information and traffic congestion information to the vehicle 12 (FIG. 1).

The server-side control section 64 is formed of a processor such as a CPU. The server-side control section 64 reads and executes programs stored in the server-side memory 66, and, as a result, functions of a server-side transmission/reception control section 72, a database processing section 74, and a download list creation section 76 can be realized. Operations of these sections will be described later.

The server-side memory 66 stores programs and data required for the server-side control section 64 to control each component. The server-side memory 66 and the terminal-side memory 54 (FIG. 2) may be formed of non-transitory computer readable storage media.

Operations of Vehicle Information Communication Device 30

Operations of the vehicle information communication device 30 illustrated in FIG. 2 will be explained in detail with reference to the flowcharts of FIGS. 4 and 5.

<Main Features>

In general, when communication is performed between the vehicle information communication device 30 and the servers 20 and 22, "long-range wireless communication" using the cellular communication section 58 is less likely to be subject to geographical constraints than "short-range wireless communication" using the wireless LAN communication section 56. This is because the area of wireless communication that one base station 16 can cover is larger than the area of wireless communication that one wireless access point 14 can cover.

The vehicle information communication device 30 has a feature of selectively using two communication methods depending on a real-time communication requirement for data to be transmitted to or received from the outside of the vehicle 12. The "real-time communication requirement" means the priority level of data determined depending on an acceptable time of period required to complete transmission/reception processing of the data after the vehicle information communication device 30 (typically, its terminal device) obtains the data for the wireless communication. That is, the shorter the acceptable time is, the higher the real-time communication requirement becomes (no or lesser delay in the timing of the communication is acceptable), and the longer the acceptable time is, the lower the real-time communication requirement becomes (relatively more delay in the timing of the communication is acceptable).

In the present embodiment, the real-time communication requirement for data to be transmitted is classified into three levels: "high level", "middle level", and "low level". Examples of data of "high level" include probe information of the vehicle 12 and accident information including airbag deployment information. Examples of data of "middle level" include failure information of the vehicle 12, the failure information having less urgency. Examples of data of "low level" include data for deriving therefrom useful information for business (so-called "big data"). The big data may include operation information of the information input/output section 48 (FIG. 2), destinations and via-points of the vehicle 12, and so on.

<Uploading>

Figure 4:
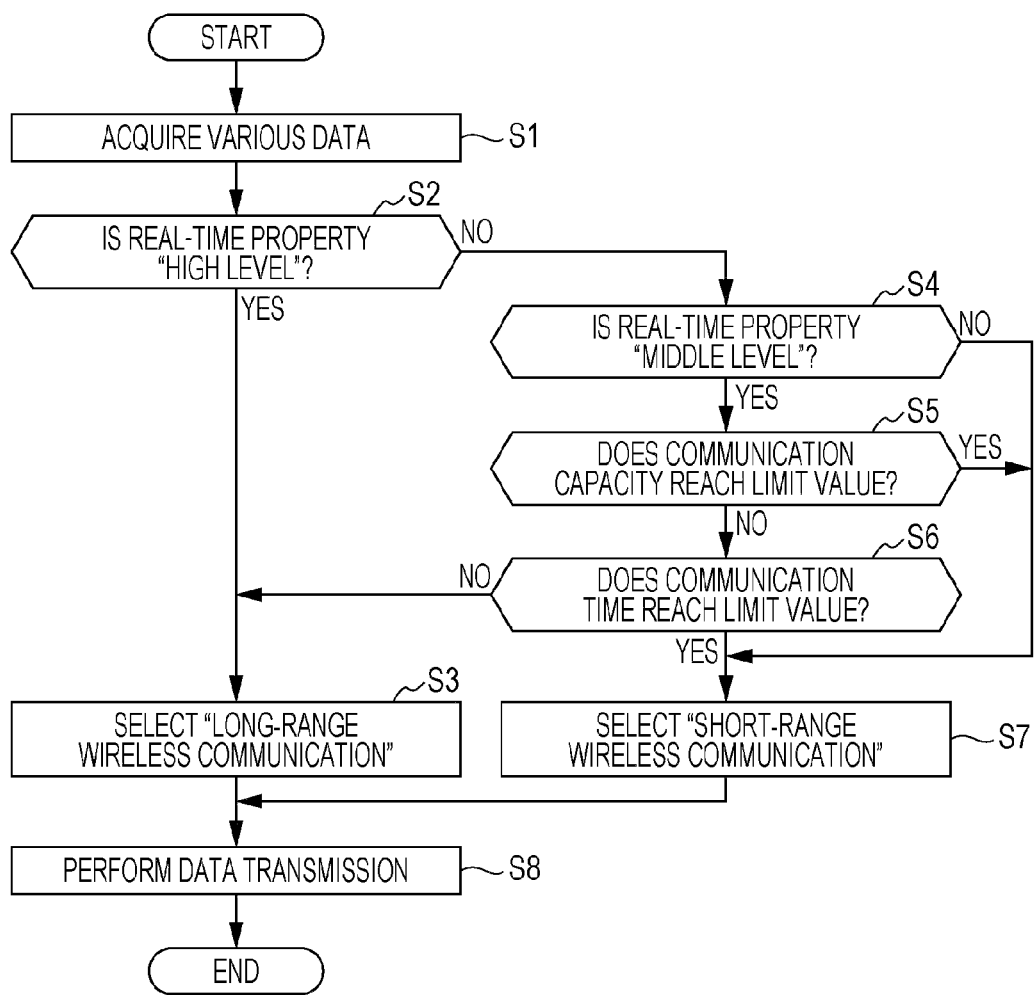
FIG. 4 is a flowchart for explaining an upload operation of the vehicle information communication device illustrated in FIG. 2.

FIG. 4 is a flowchart for explaining an upload operation of the vehicle information communication device 30 illustrated in FIG. 2.

In step S1, the data acquisition section 50 acquires various kinds of data regarding conditions of the vehicle 12. Specifically, the data acquisition section 50 acquires anomaly codes from the FI-ECU 38 and the VSA-ECU 40. Alternatively, the data acquisition section 50 acquires positional information from the GPS sensor 42, vehicle speed information from the vehicle speed sensor 43, yaw rate information from the yaw rate sensor 44, and acceleration information from the tri-axial acceleration sensor 45.

Note that these acquisition processes are executed synchronously or asynchronously with the ECU group 32 and/or the sensor group 34. Each data item, among the data items acquired in step S1, to be transmitted to the outside (the side of the servers 20 and 22) is hereinafter referred to as the "transmission target data".

In step S2, the communication method selection section 52 determines whether or not the real-time communication requirement of the transmission target data acquired in step S1 is "high level". Before this determination, the communication method selection section 52 reads and refers to the attribute table stored in the terminal-side memory 54, and thereby determines the real-time communication requirement of the transmission target data.

If it is determined that the attribute is "high level" (YES in step S2), the communication method selection section 52 selects "long-range wireless communication" as the communication method for the transmission target data (step S3). Consequently, the data for which a high degree of freshness is required can be immediately transmitted by using long-range wireless communication, which is less likely to be subject to geographical constraints.

In step S2, if it is determined that the attribute is not "high level" (NO in step S2), that is, if the attribute might be "middle level" or "low level", the process proceeds to step S4.

In step S4, the communication method selection section 52 determines whether or not the real-time communication requirement of the transmission target data is "middle level". If it is determined that the attribute is "middle level" (YES in step S4), the process proceeds to the next step (step S5).

Meanwhile, if it is determined that the attribute is not "middle level" (No in step S4), that is, the attribute is "low level", then the communication method selection section 52 selects "short-range wireless communication" as the communication method for the transmission target data (step S7). Consequently, the data for which a not-so-high degree of freshness is required can be transmitted at an appropriate timing by using short-range wireless communication, the cost of which is relatively low.

In step S5, the communication method selection section 52 determines whether or not a data communication capacity of the cellular communication section 58 reaches a limit value. Specifically, if an accumulated value of the communication capacity in a predetermined time range (one month, for example) is equal to or larger than a limit value (first threshold), the communication method selection section 52 determines that the communication capacity "reaches" the limit value, and if the accumulated value is less than the limit value, the communication method selection section 52 determines that the communication capacity "does not reach" the limit value.

For example, if a contract is made with a communication carrier, the contract stating that "the maximum communication capacity is 3 gigabytes per month for each user", the limit value may be set to "2.5 gigabytes per month", which is smaller than the maximum value of the contract. Alternatively, the limit value may be set independently according to a value specified by the user.

If it is determined that the communication capacity does not reach the limit value (NO in step S5), the process proceeds to the next step (step S6). Meanwhile, if it is determined that the communication capacity reaches the limit value (YES in step S5), the communication method selection section 52 selects "short-range wireless communication" as the communication method for the transmission target data (step S7).

As described above, the communication method selection section 52 may be configured such that the wireless LAN communication section 56 or the cellular communication section 58 is selected according to the limit of the data communication capacity of the cellular communication section 58. By taking into consideration a case where a limit of a communication capacity (in particular, an accumulated value in a predetermined time range) is imposed when using long-range wireless communication, a more appropriate communication method can be selected.

In step S6, the communication method selection section 52 determines whether or not a data communication time of the cellular communication section 58 reaches a limit value. Specifically, if a communication amount of data to be transmitted to or received from the outside of the vehicle 12 is equal to or larger than a limit value (second threshold), the communication method selection section 52 determines that the communication time "reaches" the limit value, and if the data communication amount is less than the limit value, the communication method selection section 52 determines that the communication time "does not reach" the limit value.

For example, if the limit value is 300 seconds and the communication speed of the long-range wireless communication is 128 kbps, it may be determined that a data communication amount of 4.8 megabytes or larger reaches the limit value.

If it is determined that the communication time does not reach the limit value (NO in step S6), the communication method selection section 52 selects "long-range wireless communication" as the communication method for the transmission target data (step S3). Meanwhile, if it is determined that the communication time reaches the limit value (YES in step S6), the communication method selection section 52 selects "short-range wireless communication" as the communication method for the transmission target data (step S7).

As described above, the communication method selection section 52 may be configured such that the wireless LAN communication section 56 or the cellular communication section 58 is selected according to the communication amount of data to be transmitted to or received from the outside of the vehicle 12. By taking into consideration the tendency for communication time to increase as a data communication amount increases, a more appropriate communication method can be selected. In addition, by selecting the wireless LAN communication section 56 when the data communication amount is large, and by selecting the cellular communication section 58 when the data communication amount is small, the balance of processing loads between both communication methods can be adjusted.

In step S8, the in-vehicle terminal device 36 performs transmission processing for the data by using the communication method selected in step S3 or S7. If "long-range wireless communication" has been selected, the in-vehicle terminal device 36 transmits the data to the servers 20 and 22 via the cellular communication section 58.

On the other hand, if "short-range wireless communication" has been selected, the in-vehicle terminal device 36 transmits the data to the servers 20 and 22 via the wireless LAN communication section 56. Meanwhile, if short-range wireless communication is used, transmission target data may be accumulated in the buffer memory 60, and transmitted in a batch when the wireless LAN communication section 56 can connect to a wireless access point 14.

Then, the server-side transmission/reception control section 72 receives communication data (for example, probe information) from the vehicle information communication device 30 via the server-side communication section 62. The database processing section 74 stores the received latest probe information in the probe information DB 68 to update the database for probe information. The upload operation of the vehicle information communication device 30 is completed in this manner.

<Downloading>

Next, download operation of the vehicle information communication device 30 (FIG. 2) will be explained. In the present embodiment, the real-time communication requirement for data to be received is classified into three levels: "high level", "middle level", and "low level", as with the case of the transmission target data. Examples of data of "high level" include traffic congestion information including Vehicle Information and Communication System (VICS, registered trademark), and weather information. Examples of data of "middle level" include a list of messages having less urgency, among the messages for notifying the user of failure information of the vehicle 12. Examples of data of "low level" include map information and update programs.

Figure 5:
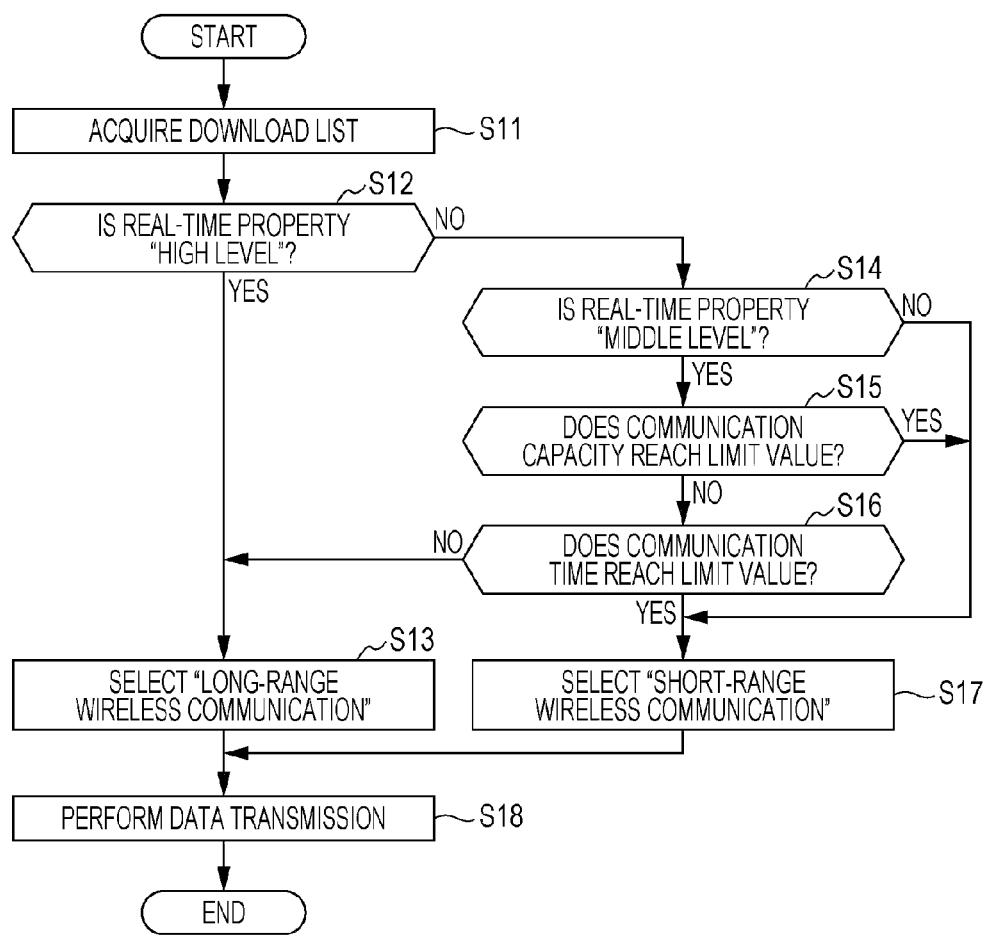
FIG. 5 is a flowchart for explaining a download operation of the vehicle information communication device illustrated in FIG. 2.

FIG. 5 is a flowchart for explaining a download operation of the vehicle information communication device 30 illustrated in FIG. 2.

In step S11, the data acquisition section 50 acquires a download list regarding the vehicle 12. Before this acquisition process, the download creation section 76 of the servers 20 and 22 refers to databases to create a download list regarding the vehicle 12. Then, the server-side transmission/reception control section 72 transmits the created download list to the vehicle information communication device 30 via the server-side communication section 62.

Each data item, among the data items listed in the download list acquired in step S11, to be received from the outside (the side of the servers 20 and 22) is hereinafter referred to as the "reception target data".

In steps S12 to S17, the communication method selection section 52 selects the wireless LAN communication section 56 or the cellular communication section 58 by taking the real-time communication requirement of the reception target data into consideration, by using the same procedures as those in steps S2 to S7 of FIG. 4.

In step S18, the in-vehicle terminal device 36 performs reception processing of the data by using the communication method selected in step S13 or S17. If "long-range wireless communication" has been selected, the in-vehicle terminal device 36 receives the data from the servers 20 and 22 via the cellular communication section 58. If "short-range wireless communication" has been selected, the in-vehicle terminal device 36 receives the data from the servers 20 and 22 via the wireless LAN communication section 56 when the wireless LAN communication section 56 can connect to a wireless access point 14.

Then, the in-vehicle terminal device 36 temporarily stores the received latest data (for example, traffic congestion information) in the terminal-side memory 54, and then visually outputs the traffic congestion information on the display of the information input/output section 48. The download operation of the vehicle information communication device 30 is completed in this manner.

Effects of In-Vehicle Terminal Device 36

The in-vehicle terminal device 36 as an in-vehicle communication device includes: the wireless LAN communication section 56 capable of performing wireless communication over a short range; the cellular communication section 58 capable of performing wireless communication over a longer range than the wireless LAN communication section 56; and the communication method selection section 52 which selects the wireless LAN communication section 56 or the cellular communication section 58 according to the real-time communication requirement for data to be transmitted to or received from the outside of the vehicle 12.

As described above, the communication method selection section 52, which selects the wireless LAN communication section 56 or the cellular communication section 58 according to the real-time communication requirement of data to be transmitted to or received from the outside of the vehicle 12, is provided, and thus, an appropriate communication method that is suitable for the freshness of data can be selected for each of various data types.

In addition, the communication method selection section 52 may select the cellular communication section 58 when the real-time communication requirement is high, and select the wireless LAN communication section 56 when the real-time communication requirement is low. By selecting the cellular communication section 58 for data for which a high degree of freshness is required, and selecting the wireless LAN communication section 56 for data for which a not-so-high degree of freshness is required, the balance of processing loads between both communication methods can be adjusted.

Modification

Figure 6:
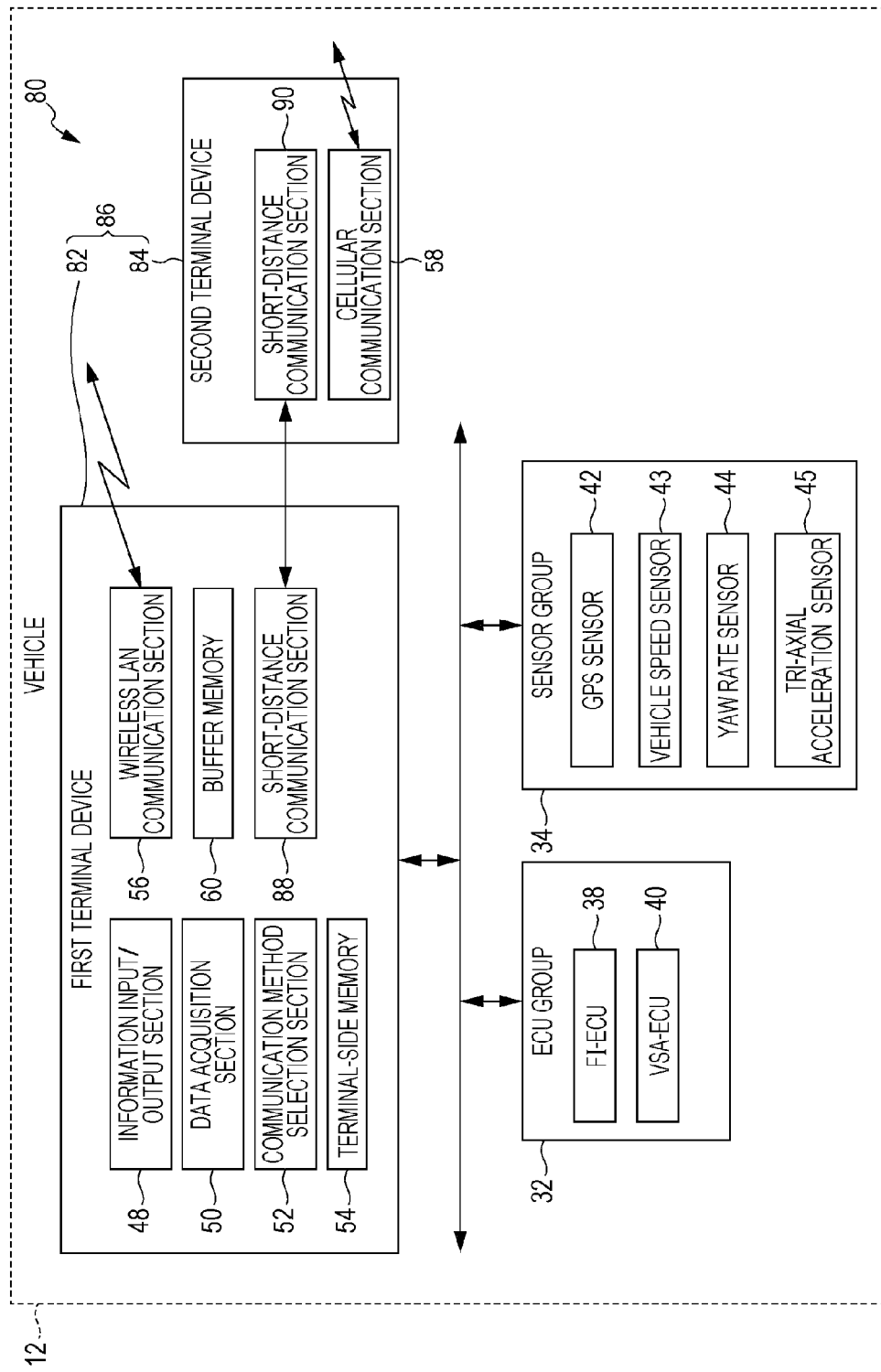
FIG. 6 is an electrical block diagram of a vehicle information communication device according to a modification.

FIG. 6 is an electrical block diagram of a vehicle information communication device 80 according to a modification. The vehicle information communication device 80 is basically made up of an ECU group 32, a sensor group 34, a first terminal device 82 having a wireless LAN communication section 56, and a second terminal device 84 having a cellular communication section 58.

In other words, the vehicle information communication device 80 differs from the vehicle information communication device 30 of the embodiment described above in that an in-vehicle terminal device 86 (the first terminal device 82 and the second terminal device 84) is provided as the in-vehicle communication device as an alternative to the in-vehicle terminal device 36 (FIG. 2).

The first terminal device 82 is formed of a display audio device or a car navigation device, as with the in-vehicle terminal device 36 (FIG. 2). The first terminal device 82 is provided with a short-distance communication section 88, in addition to an information input/output section 48, a data acquisition section 50, a communication method selection section 52, a terminal-side memory 54, and a buffer memory 60.

The second terminal device 84 is formed of a mobile phone including a smartphone, or a personal digital assistant (PDA). The second terminal device 84 is provided with a short-distance communication section 90, in addition to a cellular communication section 58.

The short-distance communication sections 88, 90 are formed of communication modules capable of connecting to each other through wired or wireless communication. This communication may include short-distance wireless communications including Bluetooth (registered trademark), and wired communications including a universal serial bus (USB) and a high-definition multimedia interface (HDMI, registered trademark).

The vehicle information communication device 80 being configured as described above basically operates in accordance with the flowcharts of FIG. 4 and FIG. 5. As a result, the same function effect as the above embodiment can be obtained.

Note that, in step S8 in FIG. 4, the in-vehicle terminal device 86 performs transmission processing of data via the short-distance communication section 88, the short-distance communication section 90, and the cellular communication section 58. Similarly, note that, in step S18 in FIG. 5, the in-vehicle terminal device 86 performs reception processing of data via the cellular communication device 58, the short-distance communication section 90, and the short-distance communication section 88.

Supplemental Remarks

The present disclosure is not limited to the embodiment and the modification described above, and various modifications are conceivable within the scope of the present disclosure.

In the preferred embodiments, the real-time communication requirement of reception target data is determined by the communication method selection section 52 of the vehicle 12. However, the vehicle information communication system may be configured such that the determination is made on the side of the servers 20 and 22. In such a case, the servers 20 and 22 perform processing of steps S12 to S17 of FIG. 5 in advance to classify each data into data for "long-range wireless communication" or data for "short-range wireless communication". Then, the servers 20 and 22 transmit appropriate data to the in-vehicle terminal device 36 when there is an access from either of the communication methods. As a result, the same operation function as the download operation described above can be realized.

What is claimed is:
1. An in-vehicle communication device to be installed in a vehicle, comprising:
a short-range communicator configured to perform wireless communication with a first access point over a first range;

a long-range communicator configured to perform wireless communication with a second access point over a second range longer than the first range;

a memory that stores therein a level of a real-time communication requirement of each of different types of data in association with of the types of data, the data comprising probe or accident information to be transmitted from the vehicle and traffic or weather information to be received by the vehicle, said information being associated with a higher level than data other than said information; and a communication selector configured to select the short-range communicator or the long-range communicator to perform the wireless communication according to said each level of the real-time communication requirement for the data to be transmitted to or received from the first or second access point outside of the vehicle, wherein the communication selector selects the long-range communicator to perform the wireless communication of the probe or accident information and the traffic or weather information.

2. The in-vehicle communication device according to claim 1, wherein the communication selector selects the long-range communicator when the real-time requirement is high, and selects the short-range communicator when the real-time requirement is low.

3. The in-vehicle communication device according to claim 1, wherein the communication selector selects the short-range communicator or the long-range communicator according to a limit of a data communication capacity allowed for the long-range communicator.

4. The in-vehicle communication device according to claim 3, wherein the communication selector selects the short-range communicator if an accumulated value of the communication capacity in a predetermined time range is equal to or larger than a first threshold, and selects the long-range communicator if the accumulated value of the communication capacity is smaller than the first threshold.

5. The in-vehicle communication device according to claim 1, wherein the communication selector selects the short-range communicator or the long-range communicator according to a communication amount of data to be transmitted to or received from the first or second access point outside of the vehicle.

6. The in-vehicle communication device according to claim 5, wherein the communication selector selects the short-range communicator if the communication amount of the data is equal to or larger than a second threshold, and selects the long-range communicator if the communication amount of the data is smaller than the second threshold.

7. The in-vehicle communication device according to claim 1, further comprising an in-vehicle terminal device configured to obtain the data relating to vehicle conditions or environments and to store the data in a manner that associates the data with the real-time communication requirement thereof which is determined depending on an acceptable time of period required for the data to complete transmission and reception processing thereof after the in-vehicle terminal device obtains the data for the wireless communication.

8. An in-vehicle data-transmission device to be installed in a vehicle, comprising:

a short-range data-transmitter to perform wireless transmission of data to a first access point from the vehicle over a first range;

a long-range data-transmitter configured to perform wireless transmission of data to a second access point from the vehicle over a second range longer than the first range; and a data-transmission selector configured to select the short-range data-transmitter or the long-range data-transmitter to perform the wireless transmission according to a real-time communication requirement for the data to be transmitted to the first or second access point outside of the vehicle, wherein the data to be transmitted comprises accident information related to the vehicle, which has a higher level of the real-time communication requirement than other data such that the data-transmission selector selects the long-range data-transmitter to transmit the accident information.

9. The in-vehicle data-transmission device according to claim 8, wherein the accident information comprises information indicating airbag deployment in the vehicle.

* * * * *